(12) United States Patent
Shih-Jen

(10) Patent No.: US 6,310,914 B1
(45) Date of Patent: Oct. 30, 2001

(54) POWER SAVING INFRARED KEYBOARD TRANSMISSION METHOD

(75) Inventor: Kuo Shih-Jen, Taipei (TW)

(73) Assignee: Behavior Tech Computer Corp., Taipei (TW)

(*) Notice: Subject to any disclaimer, the term of this patent is extended or adjusted under 35 U.S.C. 154(b) by 0 days.

(21) Appl. No.: 09/110,485

(22) Filed: Jul. 7, 1998

(51) Int. Cl.[7] .............................. H03K 7/04; H03K 7/08
(52) U.S. Cl. ................................ 375/239; 375/377
(58) Field of Search ........................ 375/219, 220, 375/239, 377, 237, 238, 364, 369; 702/79; 370/212, 213; 329/313; 332/112

(56) References Cited

U.S. PATENT DOCUMENTS 4,562,484 * 12/1985 Rallapalli et al. ................ 358/261.3
5,557,540 * 9/1996 Miyashita ............................ 375/295
6,091,884 * 7/2000 Yuen et al. ............................ 386/83

* cited by examiner

*Primary Examiner*—Young T. Tse
(74) *Attorney, Agent, or Firm*—Rosenberg, Klien & Lee

(57) ABSTRACT

A power saving infrared keyboard transmission method adapted for data transmission of a cordless computer keyboard is disclosed. The cordless keyboard has a transmission modulus comprising a microprocessor which converts the information related to the operation status of the keys of the keyboard into a series of pulses comprised of at least a first data byte and a second data byte. A leader code and a start code are added to the series of pulses in front of the first data byte and the leader code and the start code are transmitted before the data bytes are transmitted. A receiving modulus which is coupled to a host machine receives the data bytes together with the leader code and the start code. The leader code and the start code are received first to serve as an identification of the transmission of the data bytes so that the receiving modulus receives and interrupts the received data efficiently and effectively.

13 Claims, 6 Drawing Sheets

POWER SAVING INFRARED KEYBOARD TRANSMISSION METHOD

BACKGROUND OF THE INVENTION

1. Field of the Invention

The present invention relates generally to communication between an infrared computer keyboard and the associated host computer and in particular to a power saving infrared keyboard transmission method which provides a more effective identification and a more efficient way of data transmission between the infrared keyboard and the host computer.

2. Related Arts

Computers are widely used nowadays to handle a number of jobs, such as word processing communication, and business transactions. In using a computer, a man-machine interface, such as input device, is of vital importance. One of the most commonly known input device is the keyboard and thus the efficiency and effectiveness in operating the keyboard plays an important role in user-controlling the computer.

Conventionally, the keyboard is coupled to the computer by means of a cable which transmits data/information between the keyboard and the host computer. However, with such a physical connection between the keyboard and the computer, it may be somehow difficult for a computer user to readily move the keyboard as he or she wishes. To overcome such a problem, cordless keyboards, such as infrared keyboards, are also available in the market wherein the keyboard is coupled to the computer in a cordless manner, such as by means of infrared signal transmitted between the keyboard and the host computer. The most important factors that control the performance of the infrared keyboard is the precision and efficiency of data/signal receiving and transmission which affects the sensitivity of the infrared keyboard.

Conventionally, the infrared keyboard encodes and transmits the information to be transmitted by means of a transmission modulus in the form of an infrared signal comprised of a series of pulses and a receiving modulus is used to receive and decode the signal. To avoid unnecessary interference from other infrared transmitters and to correctly receive the signal, the period of each of the pulses of the infrared signal has to be increased. This elongates the time interval when the infrared transmitter is maintained active in the "ON" condition which consumes power and lowers down the efficiency of data receiving operation.

Furthermore, in such a conventional way of data transmission, there may be likelihood of data missing or signal discontinutiation/interruption, for example, when the depression of a key is not firm which causes an unrecognisable signal. In such a case, the receiving modulus is not capable to correctly decode (interpret) the signal received so that repeatedly depressing the same key is required, which lowers down the sensitivity and correctness of the keyboard operation. This causes an unnecessary waste of time and power.

It is thus desirable to have a method for efficiently and effectively transmitting data between an infrared keyboard and a host computer so as to overcome the problems encountered in the prior art.

SUMMARY OF THE INVENTION

Thus, a principal object of the present invention is to provide a power saving infrared keyboard transmission method which adds identification code(s) to the series of pulses that representing the data to be transmitted so as to facilitate precisely and efficiently receiving and decoding the data received, the pulse period being significantly reduced so as to result in a reduction of power consumption and providing an overall power saving in transmitting infrared signals Another object of the present invention is to provide a power saving infrared keyboard transmission method which adds an identification code and a data beginning code and has function of transmission timer interruption so that signal reception, decoding and signal discrimination may be properly performed even in case that a data missing or signal discontinued situation occurs which enhances the sensitivity of the overall operation of the keyboard.

To achieve the above objects, in accordance with the present invention, there is provided a power saving infrared keyboard transmission method wherein the infrared keyboard has a transmission modulus comprising a microprocessor which converts the information related to the operation status of the keys of the keyboard into a series of pulses comprised of at least a first data byte and a second data byte. A leader code and a start code are added to the series of pulses in front of the first data byte and the leader code and the start code are transmitted first before the data bytes are transmitted. A receiving modulus which is coupled to a host machine receives the data bytes together with the leader code and the start code. The leader code and the start code are received First to serve as an identification of the transmission of the data bytes so that the receiving modulus receives and interprets the received data efficiently and effectively.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
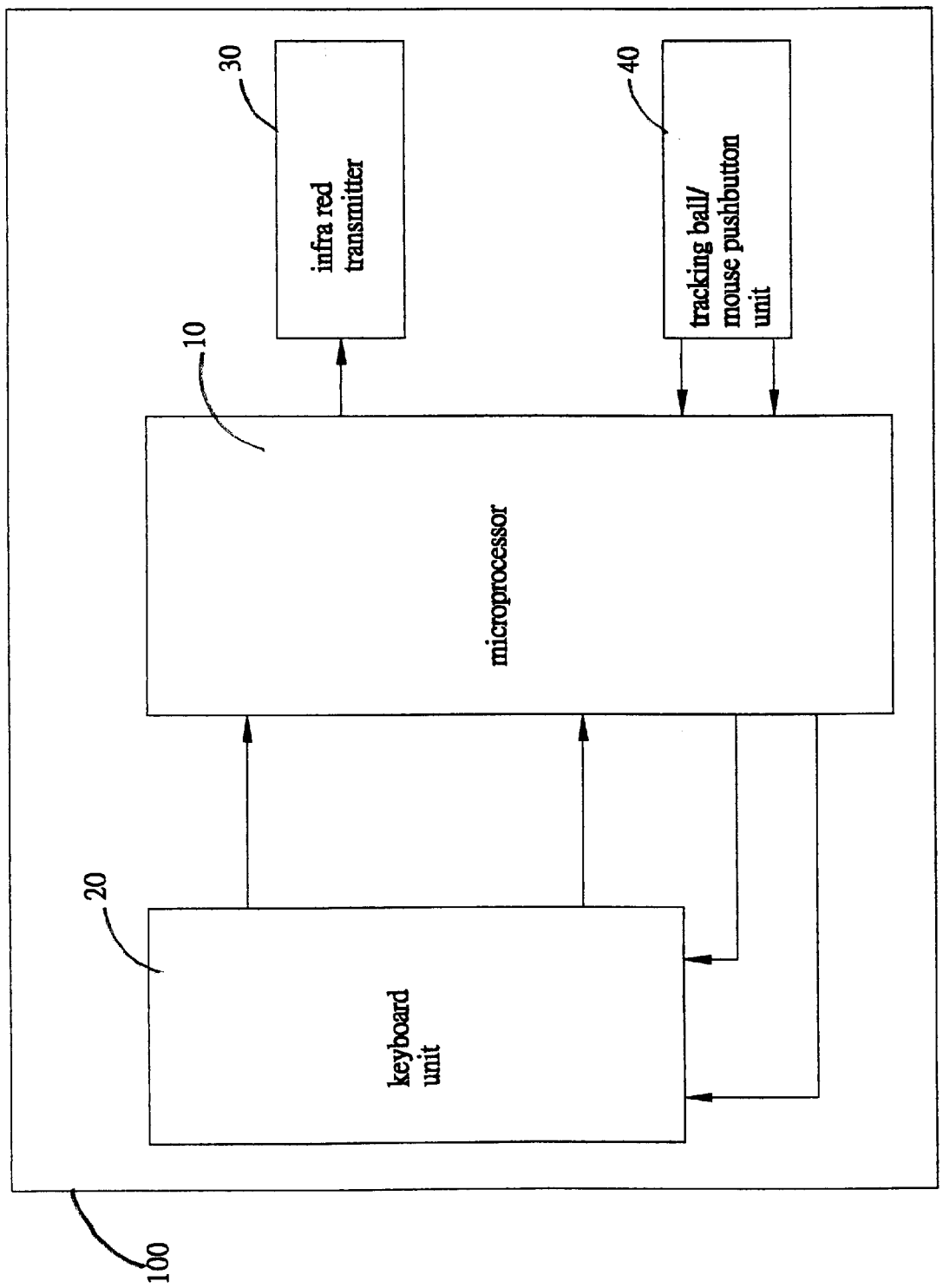
FIG. 1 is a circuit block diagram showing the transmission modulus incorporated in the keyboard in accordance with the present invention.

With reference to the drawings and in particular to FIG. 1, wherein a circuit block diagram of an infrared transmission module for carrying out the power saving infrared keyboard transmission method in accordance with the present invention is shown, the infrared transmission module which is generally designated with reference numeral 100 is independently powered by a direction current (DC) power source (not shown), comprising a microprocessor 10 which provides the functions of coding/decoding, timing and generation of infrared transmission signal. The microprocessor 10 is connected to a keyboard unit 20 to receive a keyboard signal generated by operating (actuating) a key matrix (not shown) or the keyboard unit 20 and decodes the keyboard signal. The decoded signal is then re-coded by the microprocessor 10 to provide a first transmission signal representing keyboard information to be transmitted which is generally designated with reference character KT in FIG. 2 and is to be transmitted by an infrared transmitter 30 in the form of infrared signal.

A tracking ball/mouse pushbutton unit 40 may also be contained in the transmission module 100 to enhance the operation of the keyboard unit 20 for the purpose of Cursor positioning. The function of the tracking ball/mouse is well known and no description is needed.

Figure 3:
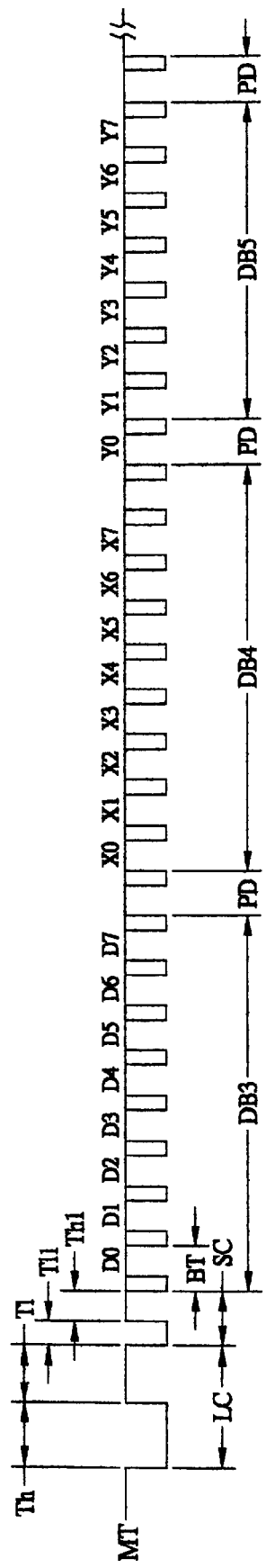
FIG. 3 is the timing diagram of the tracking ball/mouse pushbutton information transmission signal.

Similar to the keyboard unit 20, the tracking ball/mouse pushbutton unit 40 generates and provides signals representing cursor position and actuation of tracking ball/mouse pushbutton to the microprocessor 10 which are decoded by the microprocessor 10 and then re-coded to generate a second transmission signal representing tracking ball/mouse information which is generally designated with reference character MT in FIG. 3 and is to be transmitted by an infrared transmitter 30 in the form or infrared signal.

Figure 2:
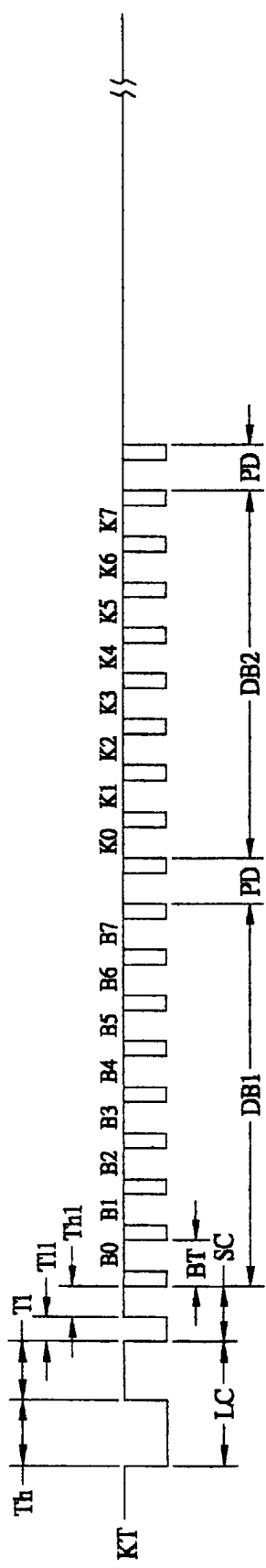
FIG. 2 is the timing diagram of the keyboard information transmission signal.

With reference to FIG. 2 which shows a timing diagram of the keyboard information transmission signal KT generated by the microprocessor 10 or the transmission modulus 100, the keyboard information transmission signal KT is in the form of a serial signal, comprising in sequence (from left hand side of FIG. 2 to the right hand side) a leader code LC, a start code SC, and two data bytes DB1 and DB2, each followed by a parity code PD. The leader code LC has an interval determined in accordance with practical need which is 1800 μs in the embodiment illustrated. However, the leader code LC comprises a high level period Th having a level corresponding to logic high (for example "1" for positive logic system) and a low level period Tl having a level corresponding to logic low (for example "0" for positive logic system) and the ratio between the high level period Th and the lower level period Tl is fixed which in the embodiment illustrated is 1:1.25.

Similarly, the start code SC comprises a high level period Th1 and a low level period Tl1 which has a fixed ratio, such as 1:1 in the embodiment illustrated. The ratio is fixed, but the overall interval for the start code SC may be varied in accordance with practical needed. The time interval for the start code in the embodiment illustrated is 600 μs. Thus with the definition for both the start code SC and leader code LC given above, the starting point of the data bytes DB1 and DB2 that follow the start code SC may be properly identified.

The data bytes DB1 and DB2 are comprised of eight (8) bits B0–B7 and K1–K7, each having an identical pulse period BT which is 600 μs in the embodiment illustrated. A positive logic "1" in the data is presented by a 600 μs period of high level, while a positive logic "0" is presented by a 300 μs high level and a 300 μs low level. As compared with the conventional technique, this is one-third shorter than the conventional technique.

The parity code PD is added to each of the data bytes DB1 and DB2 for checking and error detection purpose.

In accordance with the present invention, the data bits B0–B7 of the data byte DB1 provides the information or control parameters of the transmission module 100 and the keyboard unit 20, including user's channel, repeating key actuation, direction current power status, key type and so on. This is conventional technique of cordless keyboald so that no further detail is needed. The data bits K1–K7 of the data byte DB2 provides the encoded information of the keys of the keyboard unit 20, such as ASCII, and the key actuation status.

FIG. 3 shows the timing diagram of the tracking ball/ mouse pushbutton information transmission signal MT generated by the microprocessor 10 or the transmission module 100 which is in the form of a serial signal comprising, in sequence (from left hand side of FIG. 3 to the right hand side) a leader code LC, a start code (SC) and three data bytes DB3, DB4 and DB5, each followed by a parity code PD. The leader code LC and the start code SC are the same as those used in the keyboard information transmission signal KT shown in FIG. 2 so that no further description is needed.

The data bytes DB3 DB4 and DB5 are comprised of eight (8) bits D0–D7, X1–X7 and Y1–Y7 and the parity code PD are added thereto after the bit D7, X7 and Y7 for error detection purpose.

The data bits D0–D7 of the data byte DB3 provide the control parameters of the tracking ball and information of the mouse pushbutton, including the user's channel and the actuation status of the mouse pushbuttons (including the right button, middle button and left button). This is a known technique of the cordless keyboard so that no detail is needed herein.

The data bits X1–X7 of the data byte DB4 indicate the X coordinate of the tracking ball of the tracking ball/mouse pushbutton unit 40 of the transmission module 100, while the data bits Y1–Y7 of the data byte DB5 represent the Y coordinate of the tracking ball of the tracking ball/mouse pushbutton unit 40 of the transmissions module 100.

Figure 4:
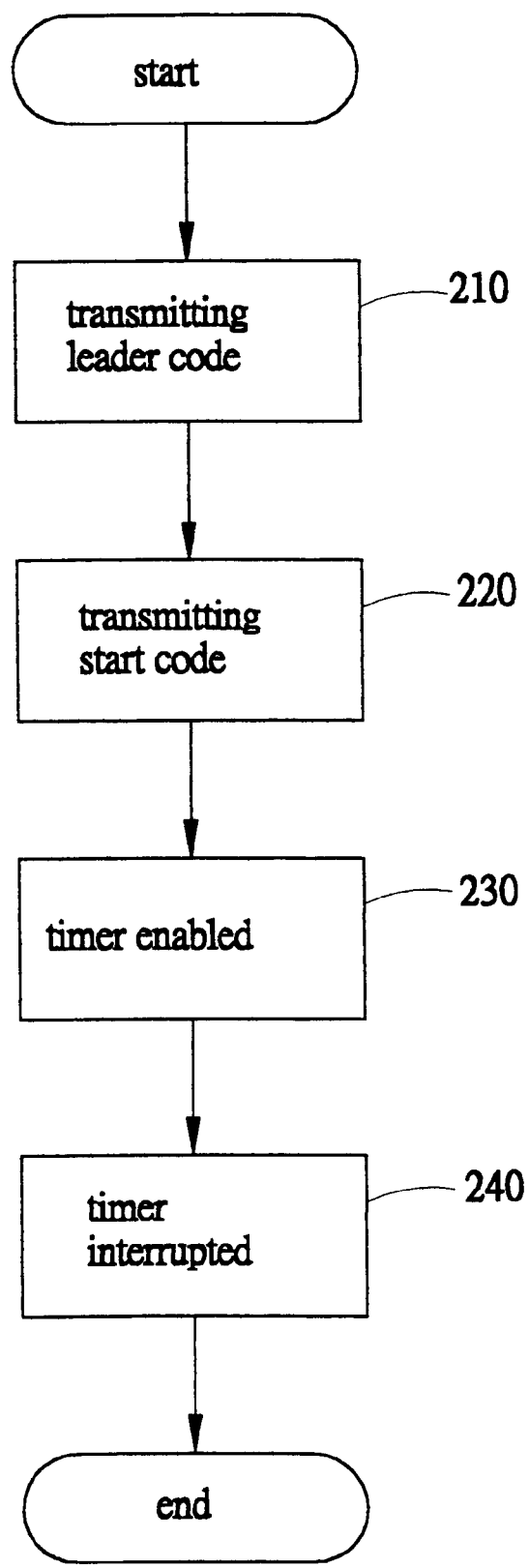
FIG. 4 is a flow chart showing the process of transmitting data in accordance with the present invention.

With reference to FIG. 4, which shows a flow chart of the transmission of the keyboard information transmission signal KT (shown in FIG. 2) and the tracking ball/mouse pushbtton information transmission signal MT (shown in FIG. 3) by means of the transmission modulus 100, in performing the transmission operation, the leader code LC is transmitted first, step 210. In other words, in attempting to transmit keyboard information and/or the tracking ball/ mouse pushbutton information, before the data bytes DB1, DB2 or DB3, DB4, DB5 are sent to the infrared transmitter 30, the microprocessor 10 generates and adds the leader code LC to the data bytes DB1, DB2 and/or DB3, DB4, DB5 to have the leader code LC transmitted by the infrared transmitter 30 first. In step 220, the start code SC is transmitted. In other vords, the microprocessor 10, alter generating the leader code LC, goes on to generate the start code SC and have the start code SC transmitted immediately after the transmission of the leader code LC.

In step 230, a timer or timing functions is started at the time after the leader code LC and the start code SC have already transinitted and when it is going to transmit the data bytes DB1, DB2 or DB3, DB4, DB5 of the keyboard infonnation transmission signal KT or the tracking ball/ mouse pushbutton information transmission signal MT. In other words, the timing function of the microprocessor 10 is enabled when it is to transmitted the data bytes DB1, DB2 or DB3, DB4, DB5 in order to monitor the transmission of the data bytes and the timer or the timing function is interrupted (step 240) every one third of each of the pulse period BT so as to check if each of the data bits B0–B7, K1–K7 and D0–D7, X1–X7, Y1–Y7 are correctly transmitted.

Figure 5:
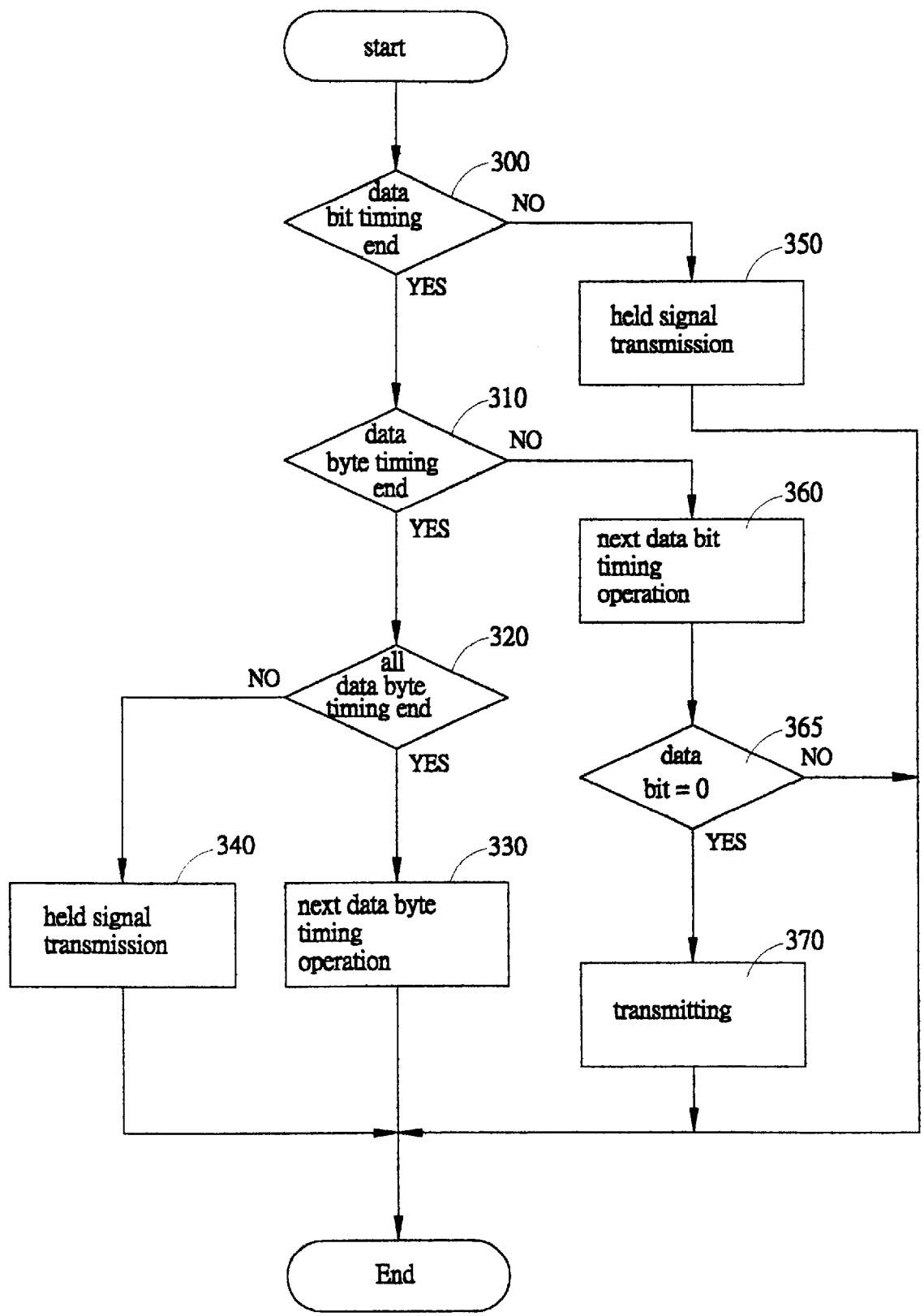
FIG. 5 is flow chart showing the operation of in-frared data transmission performed by the transmission modulus.

Referring to FIG. 5, which shows a flow chart of handling and monitoring each data bits B0–B7, K1–K7 or D0–D7, X1–X7, Y1–Y7 sent to the infrared transmitter 40 of the transmission modulus 100 to be transmitted thereby, the operation is performed by software incorporated in the microprocessor 10 of the transmission modulus 100. Since the software does not constitute novel parts of the invention, here is no need to provide a detail thereof herein.

In the flow chart of FIG. 5, steps 300–350 are the process of the timer interruption step 240 of the operation process of FIG. 4. During each interruption, it is checked if a particular data bit B0–B7, K1–K7 or D0–D7, X1–X7, Y1–Y7 is completed and if not, then the infrared transmitter 40 is held standby and the timing operation for the particular data bit B0–B7, K1–K7 or D0–D7, Y1–Y7 is continued. If the timing operation for the particular data bit is completed, then it checks if the timing operation for the whole data bytes DB1, DB2 or DB3, DB4, DB5 is completed. This may be determined by means of the parity code PD after each of the data byte. Once one data byte is completed, it checks if all the data bytes DB1, DB2 or DB3, DB4, DB5 are completed. If yes, then the operation stops, otherwise the timing operation for a next one of the data byte DB1, DB2 or DB3, DB4, DB5 is started.

Steps 360–370 of the process of FIG. 5 indicate the process of sending each of the data bits B0–B7, K1–K7 or D0–D7, Y1–Y7 to the infrared transmitter 30 to be transmitted thereby. In other words, after the steps 300–350, the timing operation of each bit being completed, while the timing operation of a whole data byte DB1, DB2 or DB3, DB4, DB5 is not completed, the data bit is transmitted. This is done by first determining the level of the bit is positive logic period "1" or "0" by using the high level period and low level period of the bit pulse interval BT. If the bit is positive logic "0", then the microprocessor 10 instructs the infrared transmitter 30 to give off a signal, otherwise, namely the bit is positive logic "1", then the infrared transmitter 30 is not actuated to give off signal. This is because in the embodiment illustrated, an infrared receiver 41 of an infrared recciving modulus 400 (see FIG. 6) used to receive and apply the received signal to for example a computer (not shown) adapts negative logic system.

Figure 6:
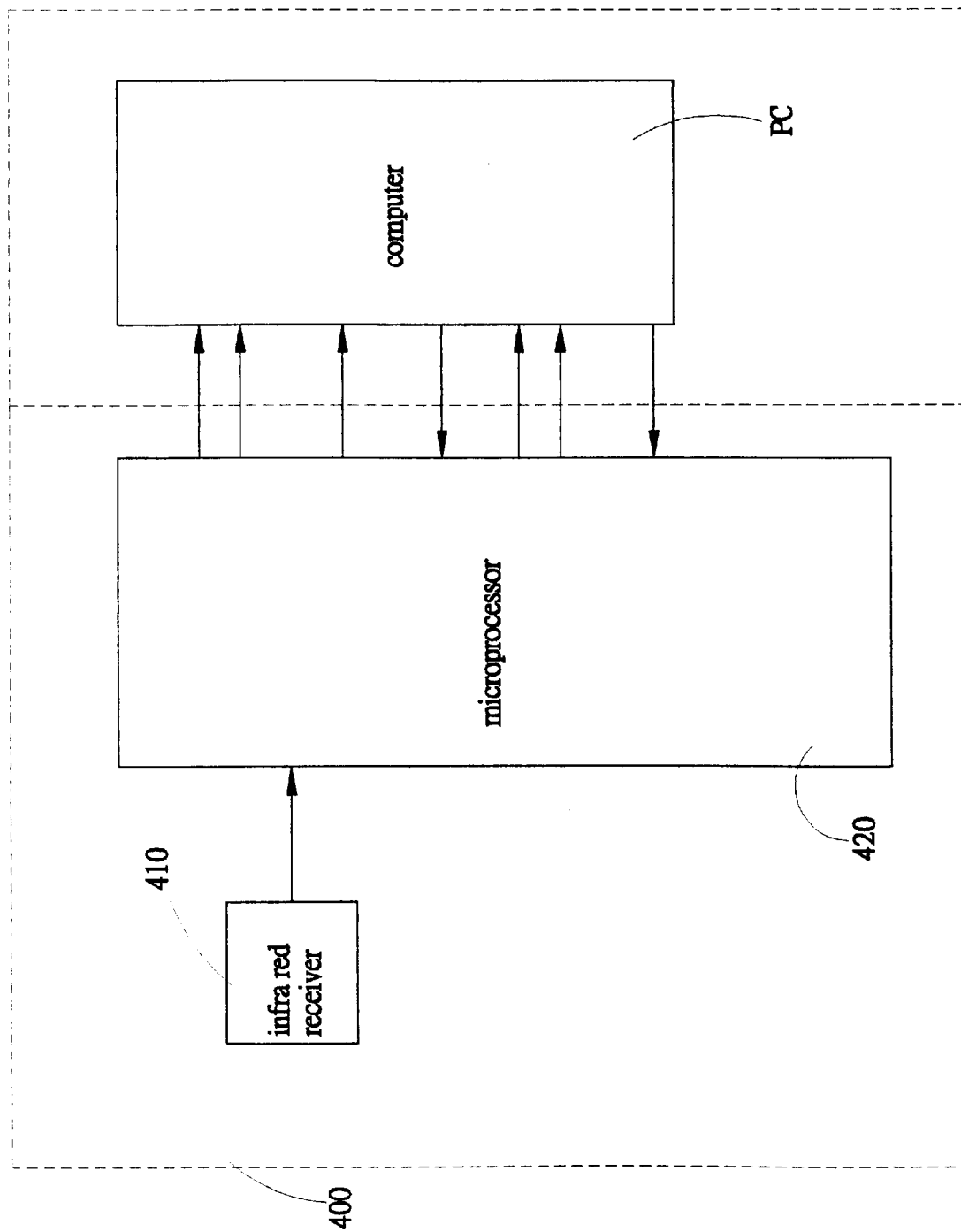
FIG. 6 is a circuit block diagram of the receiving modulus incorporated in the host computer.

With reference to FIG. 6, which shows a block circuit diagram of the infrared receiving modulus 400 for carrying out the power saving infrared keyboard transmission method in accordance with the present invention, the receiving modulus 400 is powered by a power supply of the computer, comprising an infrared receiver 410 and a microprocessor 420. The infrared receiver 410 receives the infrared signal transmitted by the infrared transmitter 30 of the transmission modulus 100. The microprocessor 420 is provided with functions of coding/decoding and storage for storing and decoding the infrared signal received thereby, that comprises the leader code LC, start code SC, data bytes DB1, DB2 or DB3, DB4, DB5 and the parity codes PD of the keyboard information transmission signal KT or the tracking ball/mouse pushbutton information transmission signal MT which is transmitted by the infrared transmitter 30 of the transmission modulus 100 and received by the infrared receivers 410. The microprocessor 420, after the decoding operation, re-codes the signals in such a fomiat corresponding to a regular keyboard signal and/or tracking ball/mouse pushbutton signal that is machine readable by a computer and sends the re-coded signals to the computer.

Figure 7:
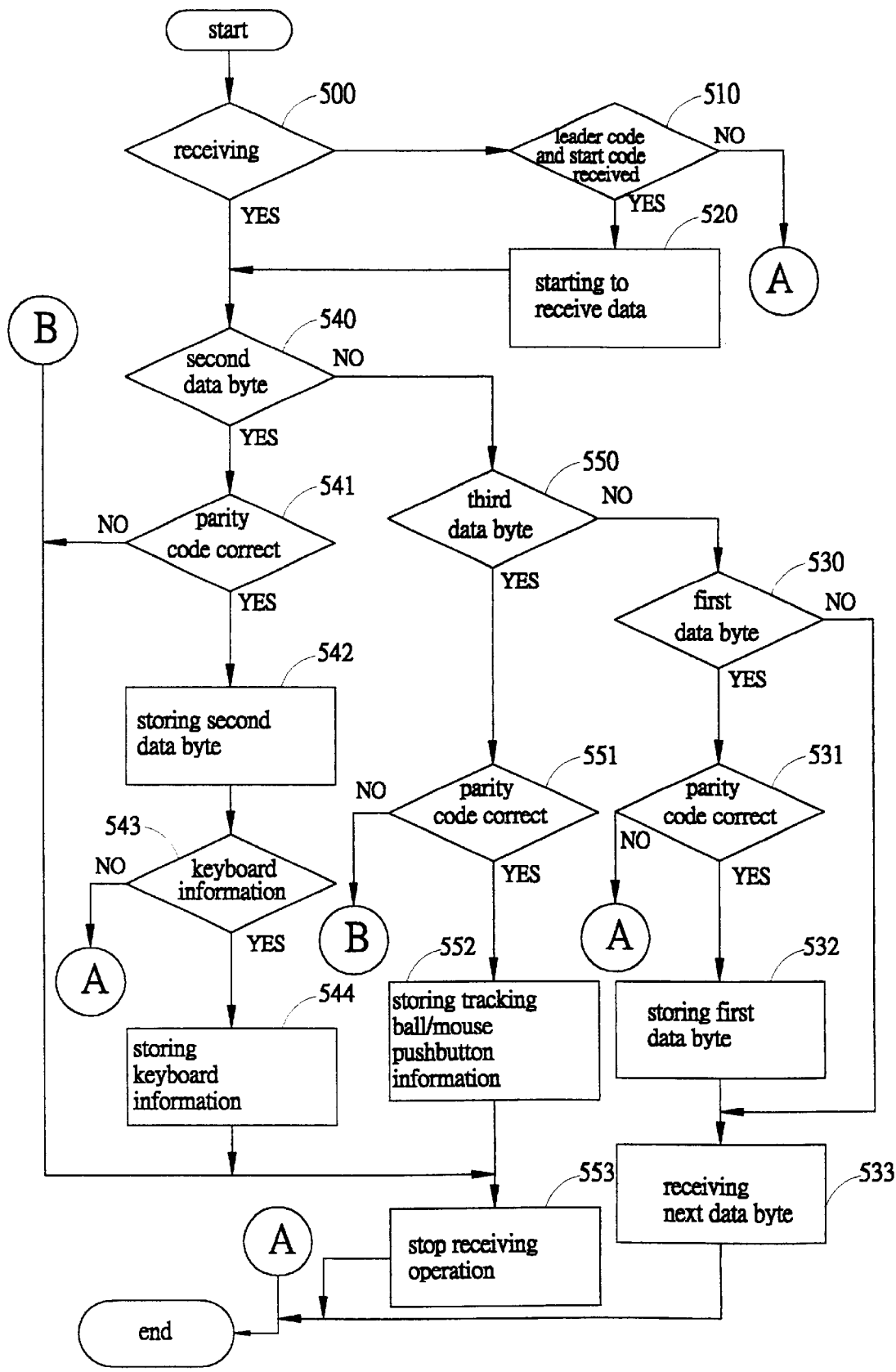
FIG. 7 is a flow chart showing the operation of infrared data reception performed by the receiving modulus.

Referring to FIG. 7, which shows a flow chart of the process of decoding and storing of the signals received by the receiving modulus 400, the process may be performed by means of software executed in the microprocessor 420. However, since such software is not the concern of the present invention and may be done by those skilled in the art of computer software and the related art of the present invention, no detail concerning the software will be given herein.

Steps 500–520 of the process are to determined if it is receiving signals which is done by checking if the leader code LC and start code SC are received. If the leader code LC and the start code SC are received, then performing the receiving operation of the keyboard information transmission signal or tracking ball/mouse pushbutton information transmission signal by sequentially receiving the leader code LC, start code SC, data bytes DB1, DB2 or DB3, DB4, DB5 and the parity codes PD. Steps 530–533 are concerned with the operation or receiving, decoding and storing the first data byte DB1 or DB3 or the keyboard information transmission signal KT or the tracking ball/mouse pushbutton information transmission signal MT. The parity code PD is tised to detennine if the receiving operation is completed and to check if the contents of the received information is correct. Steps 540–544 are concerned with the operation of receiving, decoding and storing the second data byte DB2 or DB4 of the keyboard information transmission signal KT or the tracking ball/mouse pushbutton information transmission signal MT. The parity code PD is used to determine if the receiving operation is completed and to check if the contents of the received information is correct. It also determines if the received information is the keyboard information and if it is, then the information is stored in the microprocessor 420. Steps 550–553 are concerned with the operation of receiving, decoding and storing the third data byte DB5 of the tracking, ball/mouse pushbutton information transmission signaI MT. The parity code PD is used to determine if the receiving operation is completed and to check if the contents of the received information is correct. If the information is correct, then it is stored in the microprocessor 420.

By means of the power saving infrared keyboard transmission method of the present invention shown in FIGS. 1–7, the precision an d sensitivity of data transmission between the transmission modulus 100 of the cordless keyboard and the receiving modulus 400 of the host computer are significantly enhanced. In addition, the time interval when the infrared transmitter 30 of the transmission modulus 100 is maintained in an "ON" status is considerably reduced and the operation of the infrared transmitter 30 is more precise and effective so that the power consumption of the infrared transmitter 30 and thus that of the overall system is cut down. On the other hand, by means of the addition of the leader code LC and the start code SC to the information to be transmitted to the receiving modulus 400, the identification of the information is more effective and precise so that data missing or interruption is significantly reduced and thus remarkably enhance the efficiency of data transmission.

The power saving infrared keyboard transmission method described with reference to FIG. 1–7 shows only a preferred embodiment of the present invention and is not considered limitative to the scope of the present invention which is only defined in the appended claims.

What is claimed is:

1. A method for transmitting data corresponding to actuation status of keys of a keyboard from a transmitter unit to a receiving module, wherein said transmitter unit includes a microprocessor, said method comprising the steps of:

(a) coupling said microprocessor of said transmitter unit to the keyboard to receive therefrom data corresponding to actuation status of at least one key of the keyboard;

(b) generating by said microprocessor a first transmission signal corresponding to said data received thereat, said first transmission signal including a leader code followed by a start code, and a series of data pulses following said start code, said data pulses representing said data corresponding to the actuation status of said at least one key of the keyboard, said leader code including a high level period and a low level period, durations of which are interrelated at a first predetermined ratio, said start code including a high level period and a low level period, durations of which are interrelated at a second predetermined ratio, and said series of data pulses including at least one data byte having eight data bits, said eight data bits having substantially identical pulse periods, and a parity code bit positioned at the end of said at least one data byte, wherein, for each said data bit representing a logic "1", said pulse period has a duration not exceeding 600 $\mu$s, and for each said data bit representing a logic "0", said pulse period includes a high level period and a low level period, each of a duration not exceeding 300 $\mu$s;

(c) transmitting said first transmission signal to said receiving module; and (d) interrupting the transmission of said first transmission signal at a predetermined point of said pulse period of each said data bit to check the status of the transmission of each said data bit.

2. The method as claimed in claim 1, wherein said first transmission signal comprises at least a first said data byte and a second said data byte, said data bytes representing data on a user's channel, type and actuation of the keys of the keyboard, and power supply status.

3. The method as claimed in claim 1, further comprising the steps of:

coupling said microprocessor of said transmitter unit to a tracking ball/mouse pushbutton unit to receive therefrom data corresponding to operation thereof, and generating a second transmission signal including at least first, second and third data bytes, representing data on actuation status of the mouse pushbutton, and X and Y coordinates of a cursor defined by the tracking ball.

4. The method as claimed in claim 3, wherein said transmission unit further includes an infrared transmitter for transmitting said first and second transmission signals.

5. The method as claimed in claim 4, wherein said receiving module comprises a microprocessor and an infrared receiver for receiving said first and second transmission signals, said method further comprising the steps of:

coding/decoding and storing for recognizing the received said first and second transmission signals by identifying the leader code and the start code thereof.

6. The method as claimed in claim 3, wherein said second transmission signal further includes said leader and start codes proceeding said at least first, second and third data bytes, said method further comprising the steps of:

performing said steps (c) and (d) for said second transmission signal.

7. The method as claimed in claim 1, wherein said leader code has a predetermined time duration.

8. The method as claimed in claim 7, wherein said predetermined time duration of said leader code is 1800 $\mu$s.

9. The method as claimed in claim 1, wherein said start code has a predetermined time duration.

10. The method as claimed in claim 9, wherein said predetermined time duration of said start code is 600 $\mu$s.

11. The method as claimed in claim 1, wherein said second predetermined ratio is 1:1.

12. The method as claimed in claim 1, wherein the transmission is interrupted at each ⅓ of the duration of said pulse period.

13. The method as claimed in claim 1, wherein said first predetermined ratio is 1:1.25.

* * * * *